US009547422B2

(12) United States Patent
Bryant

(10) Patent No.: US 9,547,422 B2
(45) Date of Patent: Jan. 17, 2017

(54) SYSTEM AND METHOD FOR CAPTURING NOTES ON ELECTRONIC DEVICES

(71) Applicant: BlackBerry Limited, Waterloo (CA)

(72) Inventor: Cody Bryant, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 238 days.

(21) Appl. No.: 14/201,272

(22) Filed: Mar. 7, 2014

(65) Prior Publication Data

US 2015/0253945 A1    Sep. 10, 2015

(51) Int. Cl.
| | |
|---|---|
| G06F 3/0481 | (2013.01) |
| G06F 3/0484 | (2013.01) |
| G06F 3/0488 | (2013.01) |
| G06F 17/24 | (2006.01) |
| G06F 3/048 | (2013.01) |
| H04M 1/725 | (2006.01) |
| G06F 3/14 | (2006.01) |

(52) U.S. Cl.
CPC ............. *G06F 3/0484* (2013.01); *G06F 3/048* (2013.01); *G06F 3/0481* (2013.01); *G06F 3/0488* (2013.01); *G06F 3/1454* (2013.01); *G06F 17/241* (2013.01); *H04M 1/72563* (2013.01); *G06F 2203/04803* (2013.01)

(58) Field of Classification Search
CPC .................................................... G06F 3/0481
USPC ........................................................ 715/716
See application file for complete search history.

(56) References Cited

U.S. PATENT DOCUMENTS

| | | | | |
|---|---|---|---|---|
| 5,404,442 A | * | 4/1995 | Foster ................... | G06F 3/0481 715/210 |
| 5,734,905 A | * | 3/1998 | Oppenheim .......... | G06F 3/0486 719/315 |
| 5,806,079 A | * | 9/1998 | Rivette ............. | G06F 17/30014 707/E17.008 |
| 5,821,931 A | | 10/1998 | Berquist et al. | |
| 5,852,436 A | * | 12/1998 | Franklin ............... | G06F 3/0486 715/210 |
| 5,960,447 A | * | 9/1999 | Holt ....................... | G06F 17/24 704/235 |
| 6,877,137 B1 | * | 4/2005 | Rivette ............. | G06F 17/30876 707/E17.112 |
| 7,509,577 B2 | | 3/2009 | Kuwata et al. | |

(Continued)

OTHER PUBLICATIONS

Extended European Search Report dated Jul. 30, 2015, received for European Application No. 15158109.7.

(Continued)

*Primary Examiner* — Reza Nabi
*Assistant Examiner* — Daniel Rodriguez
(74) *Attorney, Agent, or Firm* — Thomas S. Grzesik; Fleit Gibbons Gutman Bongini & Bianco P.L.

(57) ABSTRACT

A system and method are provided for enabling notes to be taken on an electronic device. The method may comprise displaying a user interface portion with a first application user interface after detecting a first input. Content is enabled to be associated with the user interface portion and the user interface portion is displayed with a second application user interface after detecting a second input. The user interface portion displayed after the second input includes the content that was associated with the user interface portion while the user interface portion was displayed with the first application user interface.

17 Claims, 17 Drawing Sheets

(56) References Cited

U.S. PATENT DOCUMENTS

| | | | |
|---|---|---|---|
| 8,532,596 B1 | 9/2013 | Park | |
| 8,555,187 B2* | 10/2013 | Margolin | G06F 9/543 |
| | | | 715/748 |
| 9,342,598 B1* | 5/2016 | Maeng | G06F 17/30864 |
| 2005/0172241 A1* | 8/2005 | Daniels | G06F 9/543 |
| | | | 715/770 |
| 2006/0129944 A1* | 6/2006 | Berquist | G06T 3/00 |
| | | | 715/764 |
| 2008/0082932 A1* | 4/2008 | Beumer | G06F 9/543 |
| | | | 715/770 |
| 2008/0141136 A1* | 6/2008 | Ozzie | G08B 21/22 |
| | | | 715/723 |
| 2011/0197155 A1* | 8/2011 | Lee | G06F 1/1616 |
| | | | 715/770 |
| 2011/0202971 A1* | 8/2011 | Margolin | H04L 67/10 |
| | | | 726/3 |
| 2012/0064947 A1* | 3/2012 | Yi | G06F 3/0483 |
| | | | 455/566 |
| 2012/0110486 A1* | 5/2012 | Sirpal | G06F 9/543 |
| | | | 715/770 |
| 2012/0231884 A1* | 9/2012 | Sakai | G06F 1/1626 |
| | | | 463/31 |
| 2012/0246594 A1* | 9/2012 | Han | G06F 3/0486 |
| | | | 715/790 |
| 2013/0191769 A1* | 7/2013 | Park | G06F 3/0488 |
| | | | 715/770 |
| 2013/0321340 A1* | 12/2013 | Seo | G06F 1/1641 |
| | | | 345/174 |
| 2014/0075354 A1* | 3/2014 | Ko | G06F 3/04883 |
| | | | 715/769 |
| 2014/0075394 A1* | 3/2014 | Nawle | H04M 1/72519 |
| | | | 715/863 |
| 2014/0101575 A1* | 4/2014 | Kwak | G06F 1/1616 |
| | | | 715/761 |
| 2014/0157169 A1* | 6/2014 | Kikin-gil | G06F 9/543 |
| | | | 715/770 |
| 2014/0160049 A1* | 6/2014 | Shin | G06F 3/0486 |
| | | | 345/173 |
| 2014/0344658 A1* | 11/2014 | Srinivasan | G06F 17/2235 |
| | | | 715/205 |
| 2014/0380142 A1* | 12/2014 | Mikutel | G06F 17/24 |
| | | | 715/234 |
| 2015/0026620 A1* | 1/2015 | Kwon | G06F 3/04845 |
| | | | 715/770 |
| 2015/0033102 A1* | 1/2015 | Losvik | G06F 17/21 |
| | | | 715/202 |
| 2015/0207850 A1* | 7/2015 | Jitkoff | H04L 67/06 |
| | | | 715/748 |
| 2015/0324086 A1* | 11/2015 | Sakamoto | G06F 3/0488 |
| | | | 345/173 |

OTHER PUBLICATIONS

Floating Apps (multitasking); https://play.google.com/store/apps/details?id=com.lwi.android.flappsfull; Jan. 11, 2014.

MultiClipboard for SmallApp; https://play.google.com/store/apps/details?id=tw.darkk6.smallapp.smallmulticlipbrd; Sep. 4, 2013.

Floating Clipboard; https://play.google.com/store/apps/details?id=tw.darkk6.floater.floatclip; Feb. 2, 2014.

Floating Stickies; https://play.google.com/store/apps/details?id=genius.mohammad.floating.stickies; Oct. 27, 2013.

Tiny Apps (floating); https://play.google.com/store/apps/details?id=com.ragingtools.tinyapps; Dec. 21, 2013.

Popup Clip; https://play.google.com/store/apps/details?id=com.kasimodo.popupclip; Jul. 30, 2013.

Everywhere Clipboard Pro; https://play.google.com/store/apps/details?id=com.smart.clipboard; Feb. 27, 2013.

Clipboard Contents; https://play.google.com/store/apps/details?id=com.martino2k6.clipboardcontents; Feb. 3, 2014.

Stolee, Kathryn T. et al.; "Revealing the copy and paste habits of end users"; Visual Languages and Human-Centric Computing; pp. 59 to 66; 2009; IEEE Symposium on Visual Languages and Human-Centric Computing (VL/HCC), 2009.

\* cited by examiner

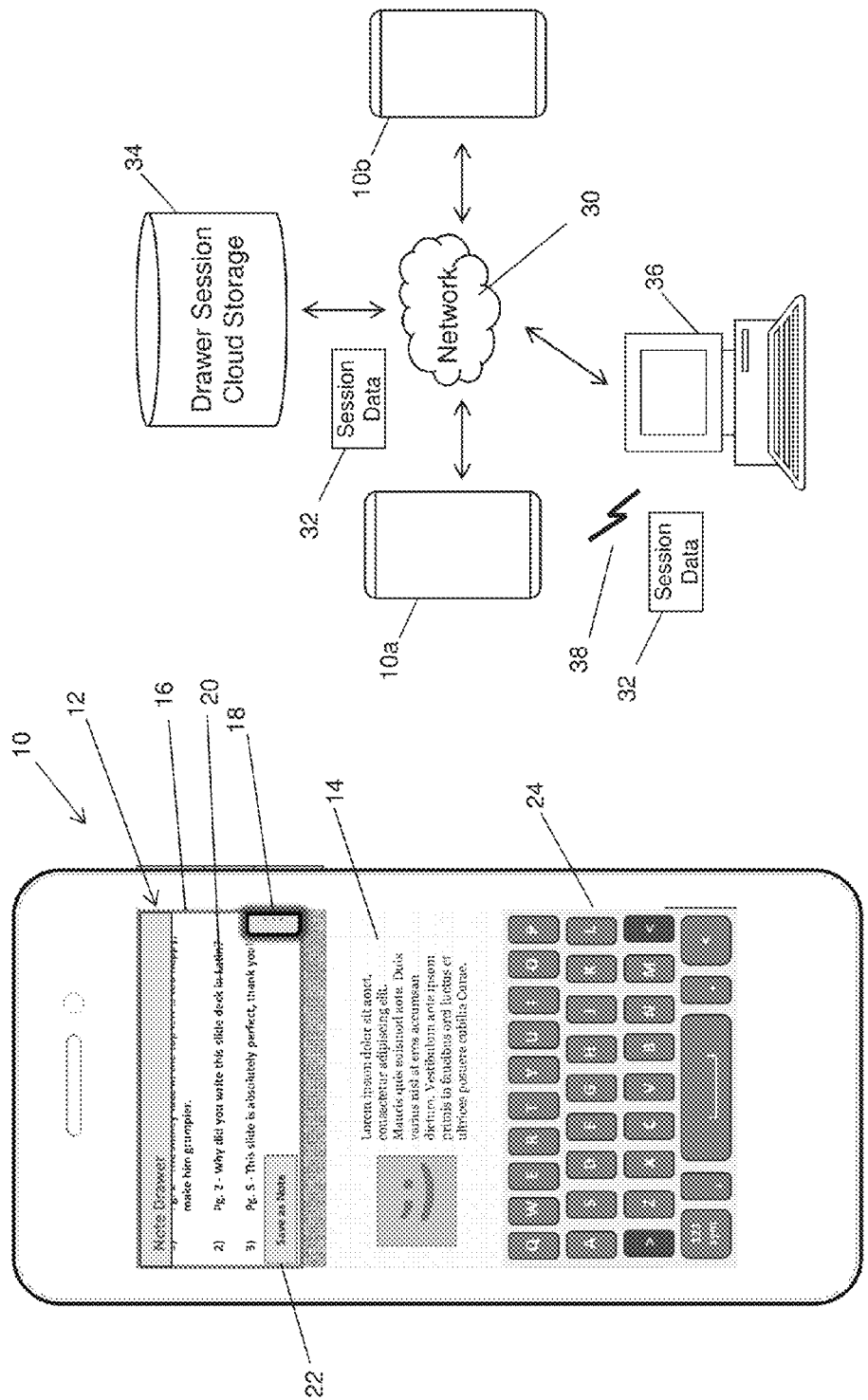

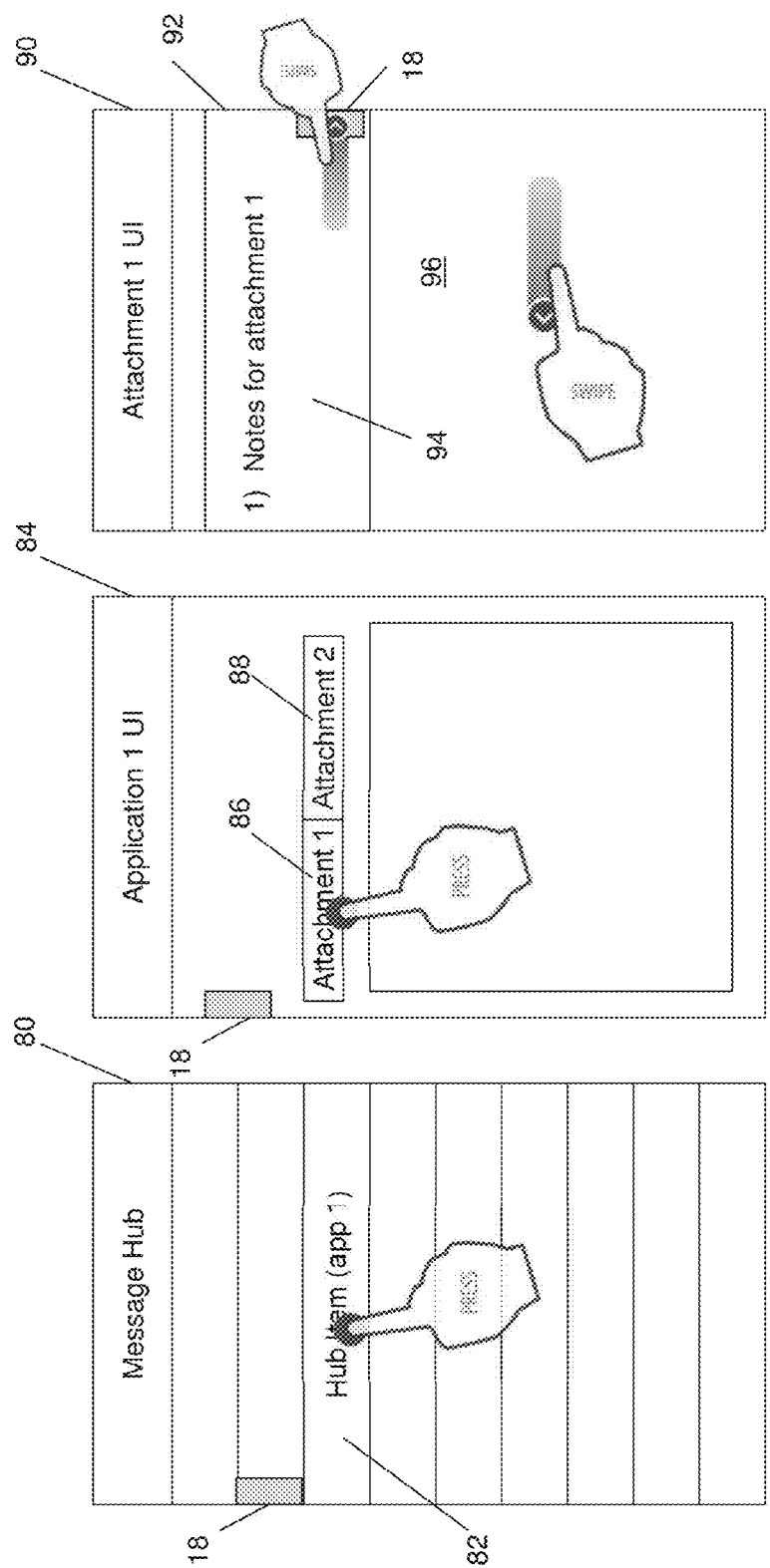

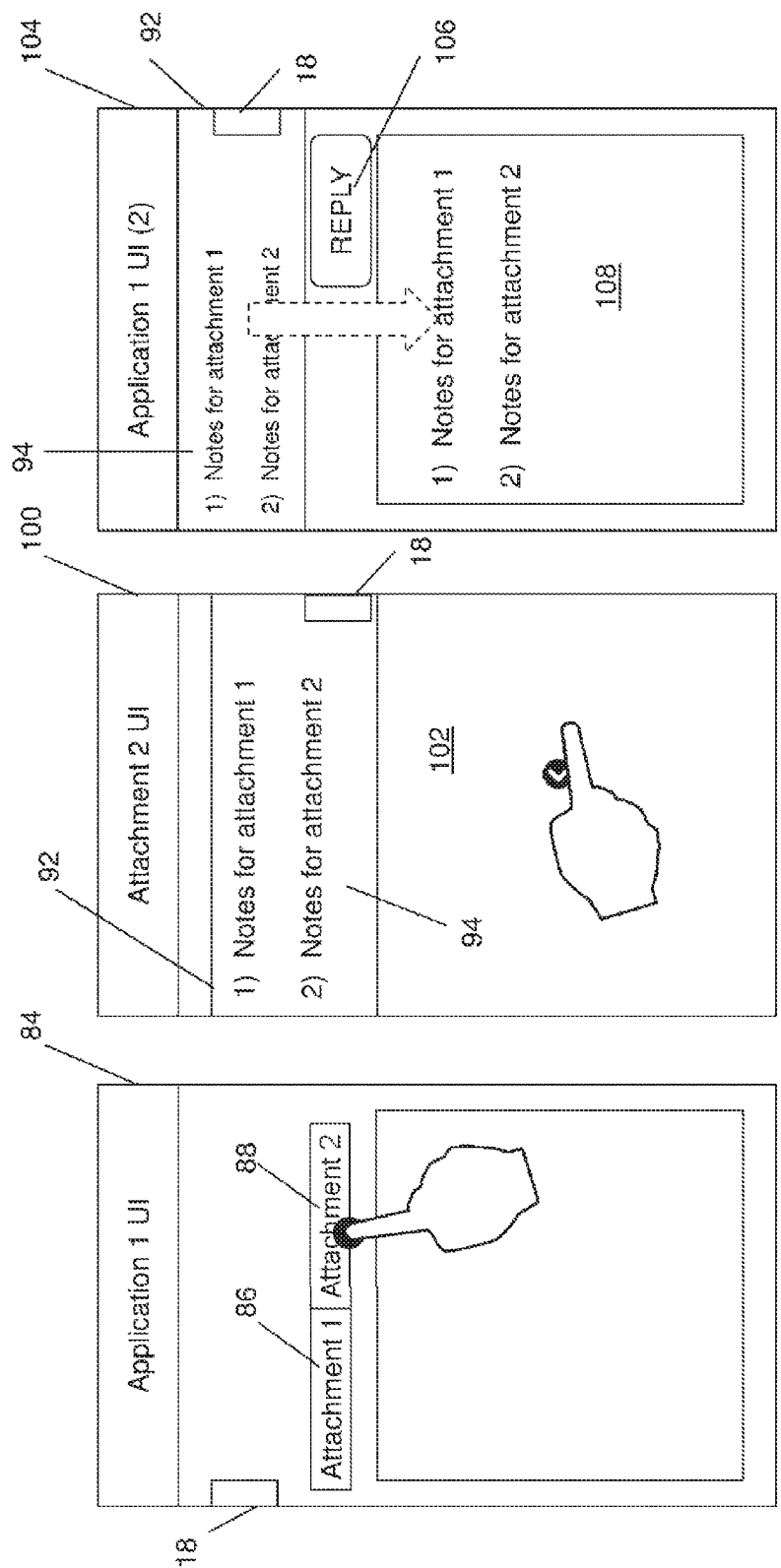

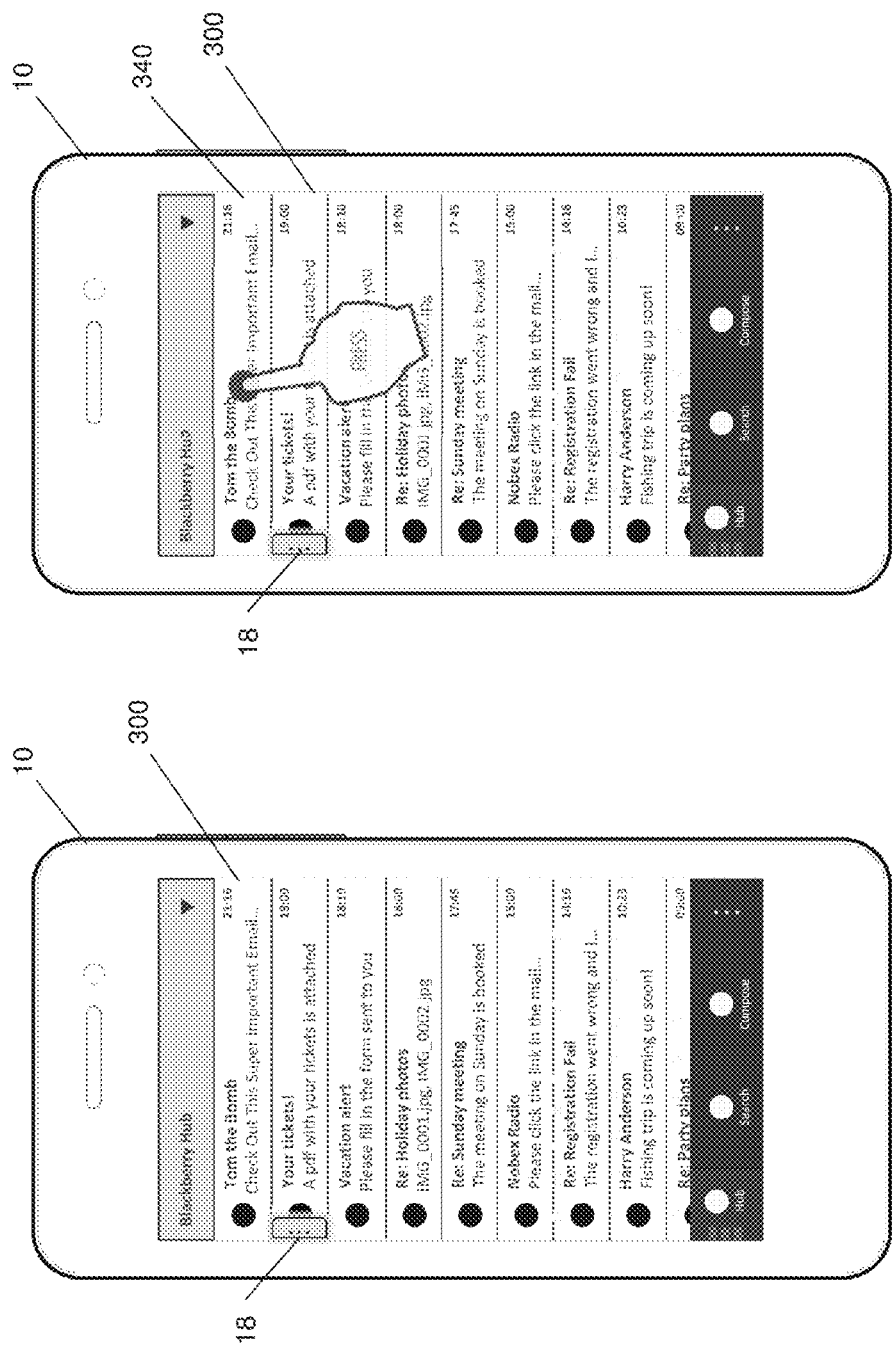

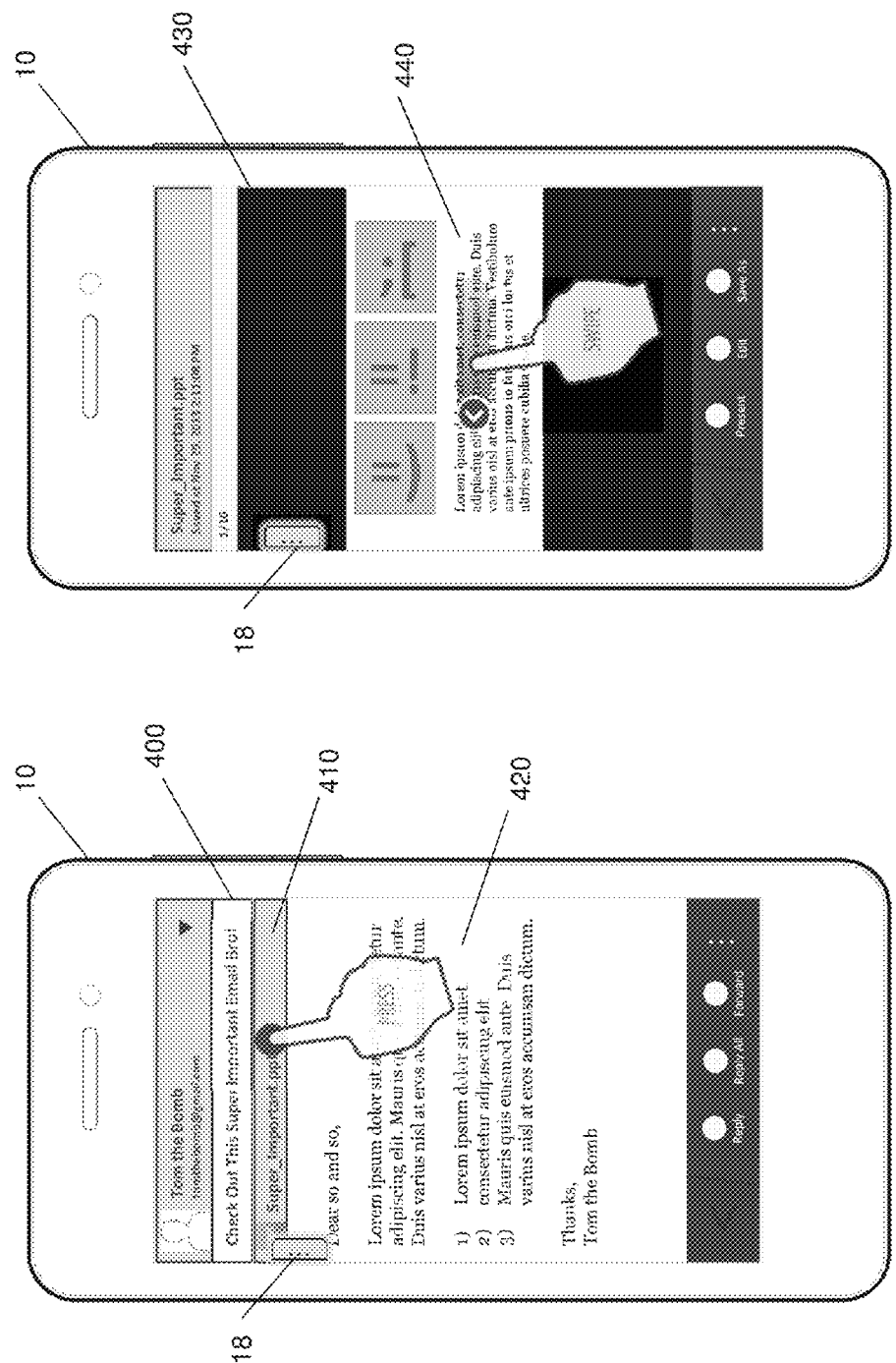

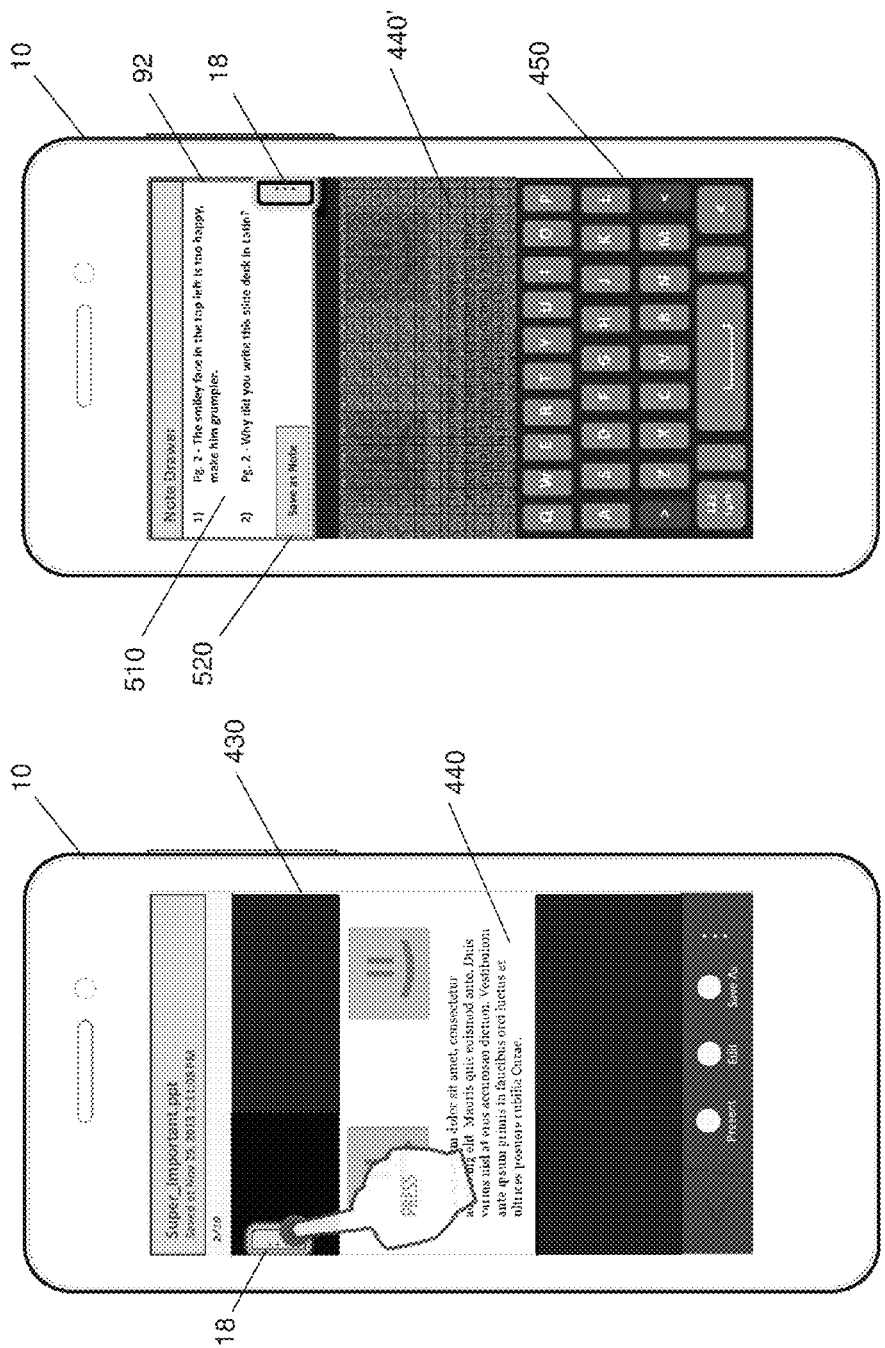

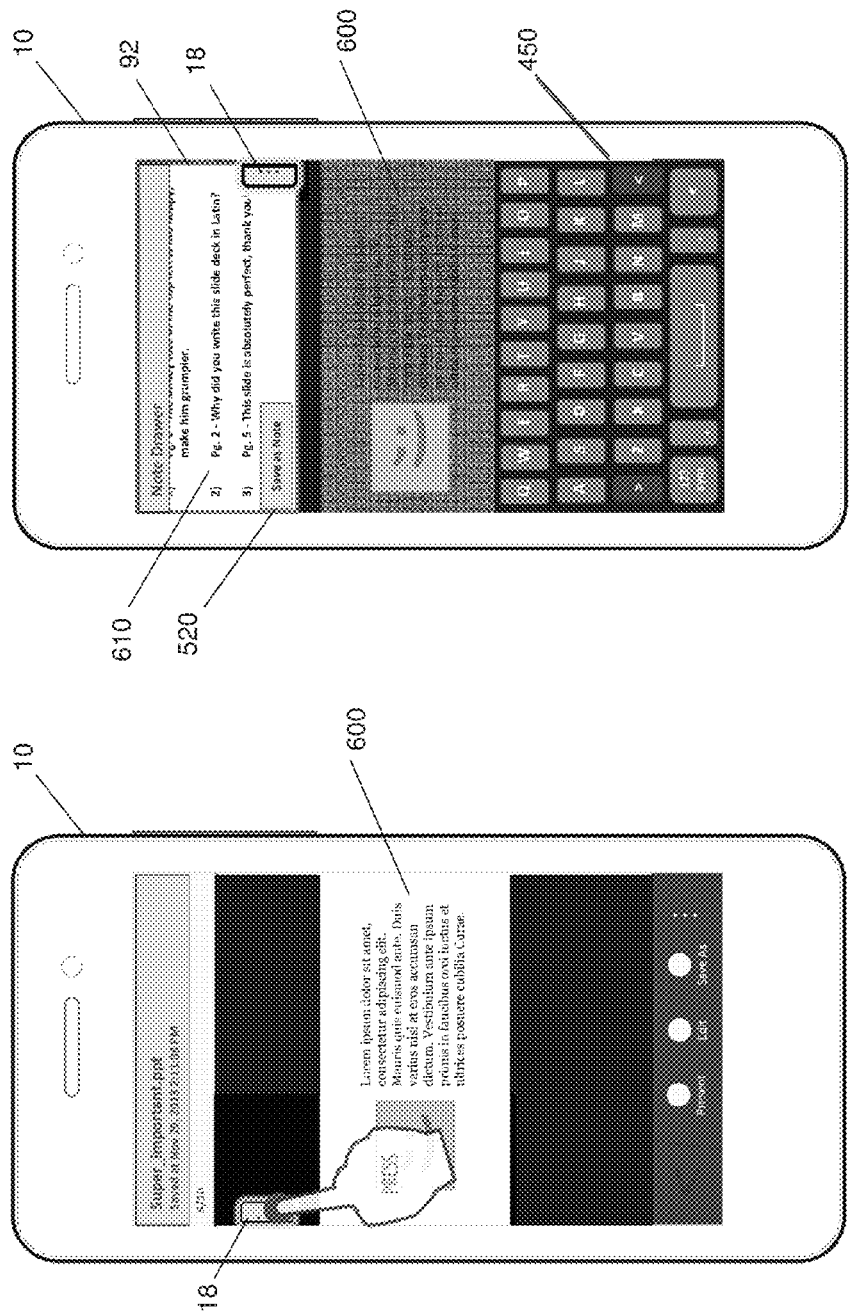

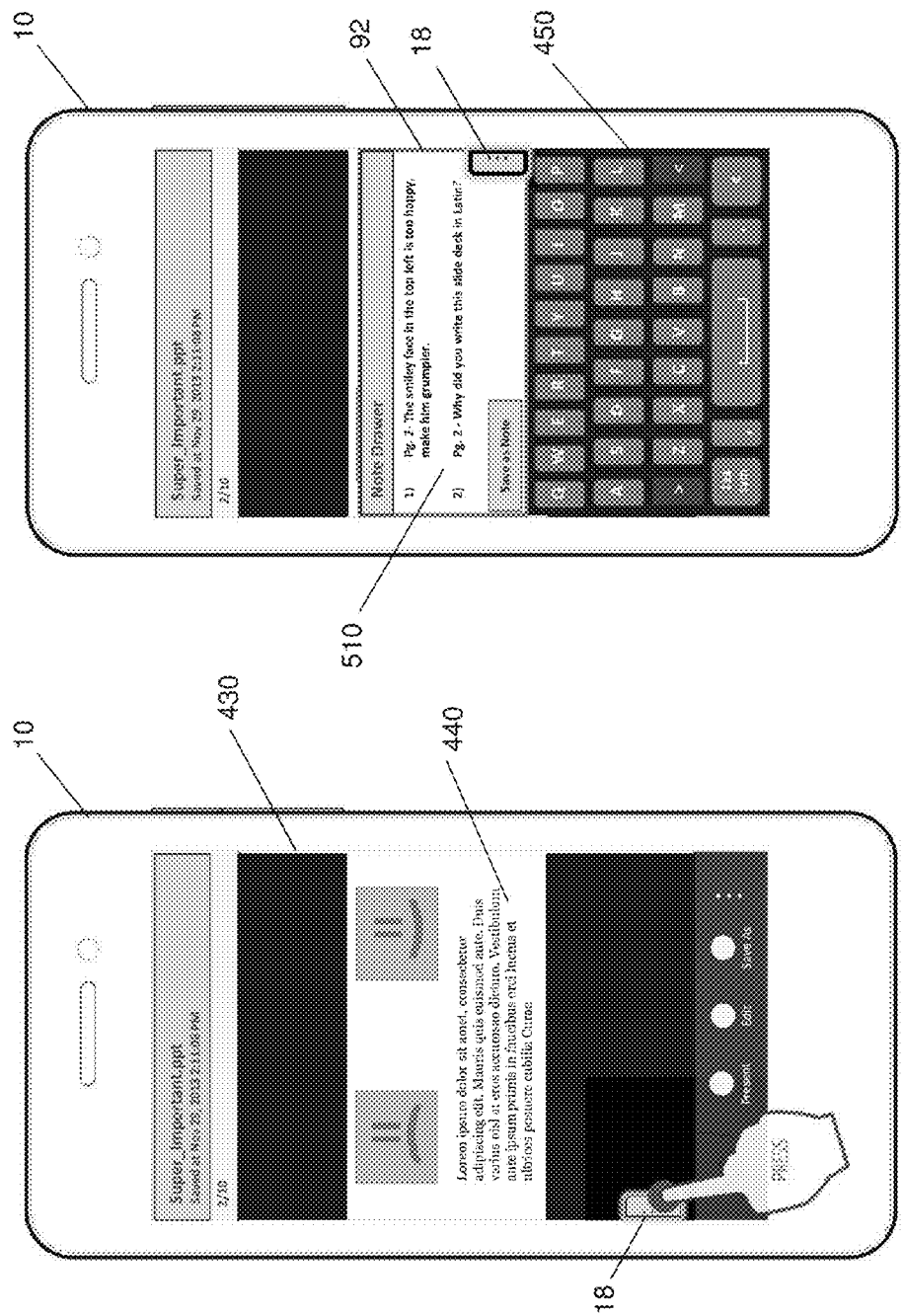

SYSTEM AND METHOD FOR CAPTURING NOTES ON ELECTRONIC DEVICES

TECHNICAL FIELD

The following relates to systems and methods for capturing notes on electronic devices.

DESCRIPTION OF THE RELATED ART

Electronic devices are often used for multi-tasking, for example, messaging, document review/revision, web searching, etc. A commonly used application in multi-tasking is a note-taking application, in addition to or instead of a copy-and-paste function on the device. Many note-taking applications require a navigation between applications making it difficult for users to utilize such functionality. Moreover, copy-and-paste functions can be cumbersome and error-prone, particularly on devices with smaller display screens.

BRIEF DESCRIPTION OF THE DRAWINGS

Embodiments will now be described by way of example with reference to the appended drawings wherein:

FIG. 1 is an exterior view of a mobile device;

FIG. 2 is a schematic diagram illustrating an example of a communication system;

FIG. 6 is a screen shot of an example of a message hub user interface;

FIG. 7 is a screen shot of an example of an application user interface;

FIG. 8 is a screen shot of an example of a user interface associated with a first attachment;

FIG. 9 is a screen shot of the application user interface of FIG. 7;

FIG. 10 is a screen shot of an example of a user interface associated with a second attachment;

FIG. 11 is a screen shot of an example of a second user interface associated with the application user interface shown in FIG. 7;

FIGS. 15 to 32 are screen shots illustrating an example workflow for using the notes drawer user interface.

DETAILED DESCRIPTION

Figure 3:
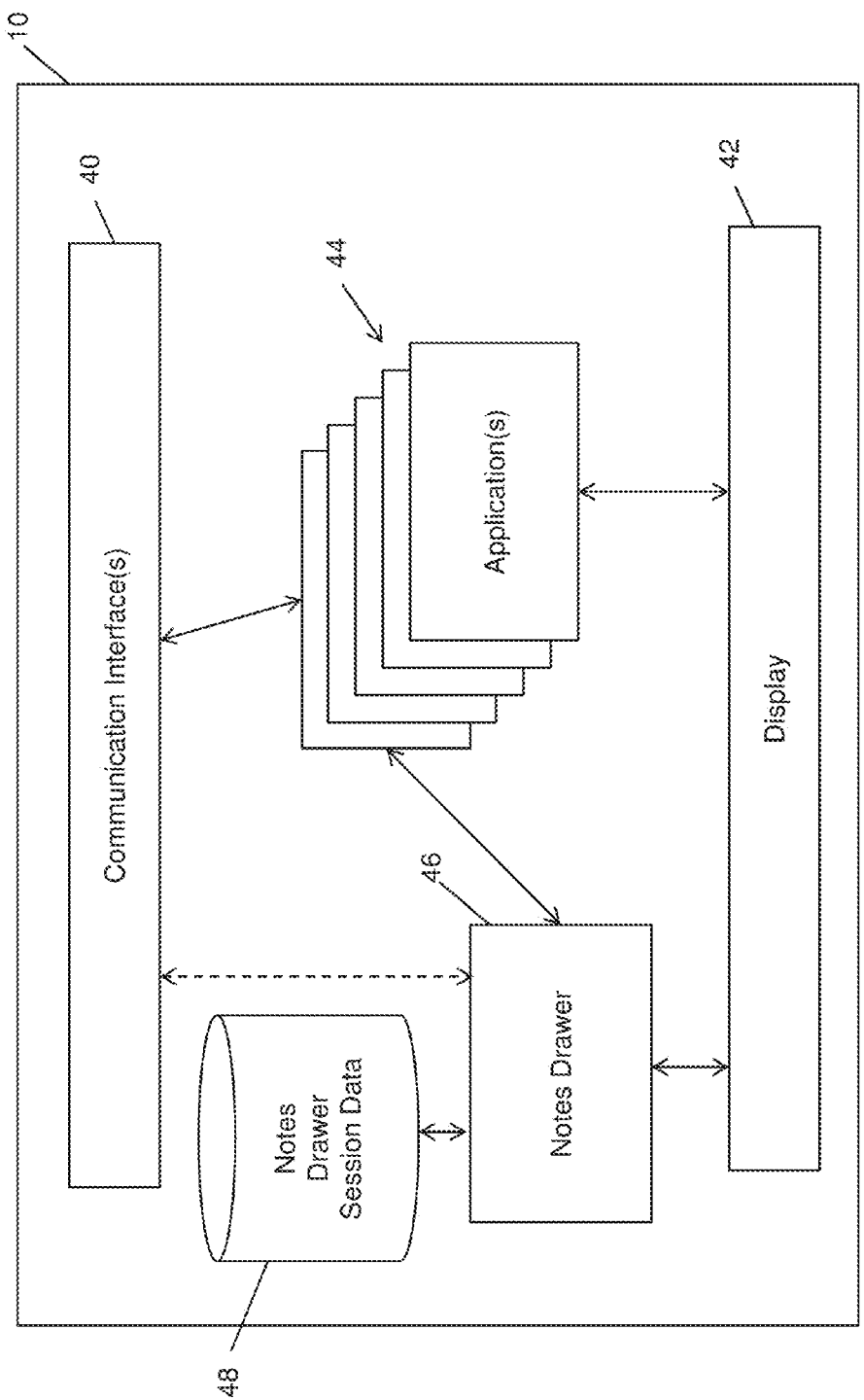
FIG. 3 is a block diagram of an example of a configuration for a mobile device.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

There is provided a method performed by an electronic device, the method comprising: displaying a user interface portion within a first application user interface after detecting a first input; enabling content to be associated with the user interface portion; and displaying the user interface portion with a second application user interface after detecting a second input, the user interface portion comprising the content that was associated with the user interface portion while the user interface portion was displayed with the first application user interface.

There is also provided a non-transitory computer readable storage medium comprising computer executable instructions for: displaying a user interface portion within a first application user interface after detecting a first input; enabling content to be associated with the user interface portion; and displaying the user interface portion with a second application user interface after detecting a second input, the user interface portion comprising the content that was associated with the user interface portion while the user interface portion was displayed with the first application user interface.

There is also provided an electronic device comprising a processor, a display and a memory, the memory comprising computer executable instructions for causing the processor to operate the electronic device, the computer executable instructions comprising instructions for: displaying a user interface portion within a first application user interface after detecting a first input; enabling content to be associated with the user interface portion; and displaying the user interface portion with a second application user interface after detecting a second input, the user interface portion comprising the content that was associated with the user interface portion while the user interface portion was displayed with the first application user interface.

Turning to FIG. 1, a mobile device 10 is shown which includes a display screen 12 for displaying user interfaces (UIs) and other graphical/visual elements. In the example shown in FIG. 1, the display screen 12 displays an application UI 14 which includes content viewable by a user of the mobile device 10. A notes drawer UI 16 is also displayed on the same display screen 12 as the application UI 14 in order to enable notes to be taken using the notes drawer UI 16 while viewing the contents of the application UI 14. The notes drawer UI 16 includes or is otherwise associated with a notes drawer tab 18 The example shown in FIG. 1 illustrates content 20 added to the notes drawer UI 16, a save option 22 in the notes drawer UI 16 for creating a separate file or other data structure to be saved in memory, and a virtual keyboard 24 that is displayed when the mobile device 10 detects a typing request event. It can be appreciated that the save option 22 shown in FIG. 1 is one example and various other options can be provided, such as a menu of options, gesture-based commands, etc.

The notes drawer UI 16 can be used in various applications, including communication-based applications and otherwise. FIG. 2 illustrates an example of a communication system in which a first mobile device 10a communicates with a second mobile device 10b over a network 30 such as the internet, cellular network, etc. In the example shown in FIG. 2, the first mobile device 10a is also configured to be able to communicate over a short-range communication connection 38 with another device, in this example a desktop computer 36. The short-range communication connection 38 can be any available communication link for which the devices 10a, 36 are configured, such as Bluetooth, WiFi, infrared, near field communications (NFC) and the like.

In addition to communicating over the network 30 and/or short-range communication connection 38, it has been found that such connectivity can be leveraged to store and share session data 32 associated with use of the notes drawer UI 16. As will be explained in greater detail below, the session data 32 can be created, saved, and shared, to enable a "session" for the notes drawer UI 16 to seamlessly cross multiple devices and locations. For example, the session data 32 can be shared with another device such as the desktop computer 36 in order to continue a session on a paired, linked, "tethered", or locally networked device. The session data 32 can also be stored both locally on the mobile device 10a, 10b and in a cloud-based server or other storage component at a remote location, e.g. a drawer session cloud storage 34 as shown in FIG. 2.

FIG. 3 illustrates an example of a configuration for a mobile device 10. The mobile device 10 includes one or more communication interfaces 40 to enable the mobile device 10 to communicate with other devices, services, and domains, e.g. to communicate via the wireless network 30, and short-range communication connection 38 shown in FIG. 2. The one or more communication interfaces 40 in this example generally represents any one or more short-range, wide-area, wired, or wireless communication connection utilizing a connection, radio, etc. The mobile device 10 also includes a display component 42, which may be used by various applications 44 and services on the mobile device 10 including a notes drawer application or component (hereinafter "notes drawer") 46 in the example shown in FIG. 3. The notes drawer 46 can also be configured to utilize the one or more communication interfaces 40 (illustrated in dashed lines in FIG. 3) to provide session data 32 to drawer session cloud storage 34 and/or other devices via a short-range communication connection 38 as shown in FIG. 2. The notes drawer 46 includes or otherwise has access to locally-stored or cached notes drawer session data 48 for storing and/or caching session data 32 for various notes drawer sessions.

Figure 4:
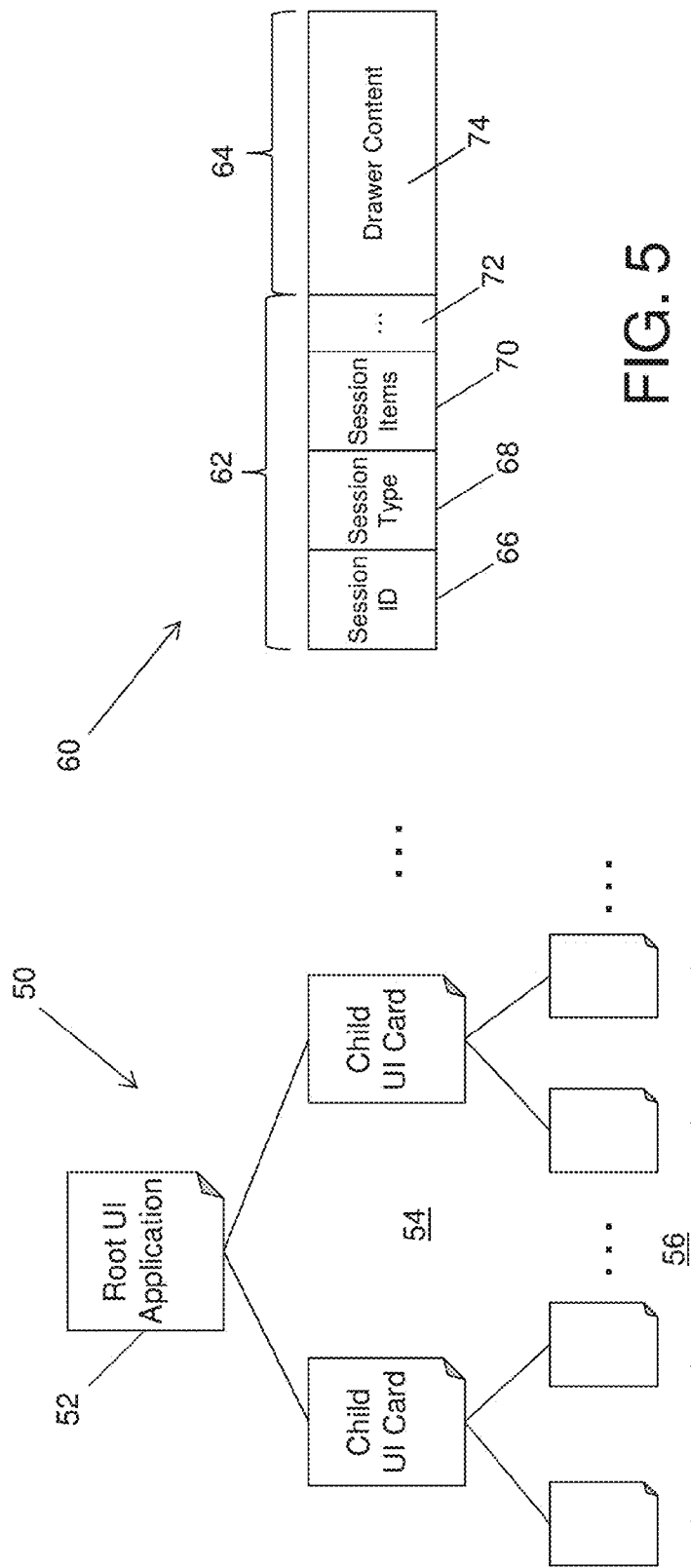
FIG. 4 is a schematic illustration of a user interface hierarchy used in defining a notes drawer session.

A notes drawer session is defined according to predetermined rules, constraints, and/or preferences, based on the environment in which the notes drawer 46 and notes drawer UI 16 are used. In one example, a session is based on a hierarchy of UI segments, also referred to as "cards" hereinafter as shown in FIG. 4. The UI cards may be considered UI segments or fragments that are borrowed from a particular application, allowing layers of UI screens from one application to be displayed in another application. As shown in FIG. 4, a session 50 can be created based on the traversal of user interactivity across application UI cards that are made available in a particular application or location in an operating system. For example, as described below, a unified inbox or "hub" listing various communications, updates, alerts, social posts, notifications, etc.; can form a base location in which a session is rooted based on an interaction with a particular item listed in the hub. When selecting such an item, a UI card can be displayed as a UI layer over the hub with deeper interactions (e.g., selecting an attachment or link within the UI card which displays a UI card for an application 44 associated with the attachment) creating new nodes and leaves within a tree-like structure.

In another example, a session 50 and its connectivity can be rooted in another common criterion such as location. In a location-based session 50, the notes drawer UI 16 may retain content added when the mobile device 10 is in a particular location. It can be appreciated that sessions can also be built from multiple sub-sessions. For example, individual sessions 50 built based on UI card navigation flow can be merged based on an explicit user request or based on a common criterion such as location, wherein a location-based session 50 is built by merging all sessions 50 created while in a particular location, area, or vicinity (e.g., all comments/notes taken while on vacation in location X).

The example session 50 shown in FIG. 4 illustrates a root UI application 52 providing a root node for the UI navigation flow, which in this example includes two child UI cards 54, each child card 54 having one or more sub-cards 56. For example, an email opened in a hub could trigger a new root UI application 52 with each attachment within the email creating child UI cards 54, and pages or slides within each attachment creating sub-cards 56. In this way, the user can navigate into a first application to take notes on a first attachment, and navigate into a second application to take notes on a second attachment, navigating through the "root" email while retaining the content from both note-taking sessions in the same notes drawer UI 16. The content 20 created within the notes drawer UI 16 can therefore be built from a logically connected session 50 without clearing/losing content or leaving content behind when a new session 50 is desired. As such, when the mobile device 10 detects navigation into a different session, an empty notes drawer UI 16 is displayed for newly created sessions 50, or previously added content is displayed from an existing session 50. It can be appreciated that the multiple sessions 50 can have the same root UI application 52, for example, where multiple sessions 50 are created from UI navigation flow stemming from the same application 44 (e.g., a unified inbox).

Figure 5:
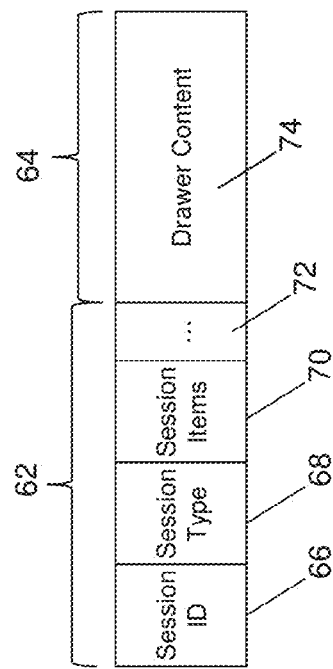
FIG. 5 is a schematic illustration of an example of a configuration for storing notes drawer session data.

The notes drawer session data 48 can be stored using various data structures and data storage techniques. For example, as shown in FIG. 5, a session data entry 60 is shown which includes a header 62 or other identification block, and a payload 64 or other memory allocation for storing drawer contents 74 for that session 50. In the example shown in FIG. 5, the header 62 includes a session ID field 66, to identify the session 50; a session type field 68 to identify a particular configuration for the session 50, e.g., UI card-based, location-based, etc.; a session items field 70 to identify the applications, attachments, instances, and other components that would fall within the hierarchy defining the session 50; and other data 72, which may be used to configure the session data entry 60 for different applications and/or uses.

Turning now to FIGS. 6 to 11 an example of a UI navigation flow for a notes drawer session 50 is shown. FIG. 6 illustrates a message hub UI 80 which includes a number of items associated with any one or more corresponding applications 44. The notes drawer tab 18 is also shown. In this example, a first hub item 82 associated with application (app) 1 is selected by pressing that hub item 82. It can be appreciated that, as shown in FIG. 6, the notes drawer tab 18 may be positioned anywhere in the message hub UI 80, in this example, in alignment with a hub item other than that being selected. After selecting the first hub item 82 as shown in FIG. 6, an application 1 UI 84 is displayed as illustrated in FIG. 7. In this example, the notes drawer tab 18 is also displayed in the application 1 UI 84, along with two attachments, a first attachment 86 having an associated application 44 for viewing the first attachment 86, and a second attachment 88 having an associated application 44 for viewing the second attachment 88.

As shown in FIG. 7, by selecting the first attachment 86, an attachment 1 UI 90 for the associated application 44 is displayed as shown in FIG. 8. The notes drawer tab 18 is carried through into the attachment 1 UI 90 and a notes drawer UI 92 can be opened or otherwise revealed by dragging or swiping the notes drawer tab 18 in a rightward direction as shown in FIG. 8. Within the notes drawer UI 92, content 94 can be added, including text as shown as FIG. 8 as well other media types such as images, audio clips, video clips, etc. The attachment 1 UI 90 also includes its own content portion 96 which includes the content of the first attachment 86 that is displayed for the user of the mobile device 10. As shown in FIG. 8, the user may interact with the content portion 96, e.g., to change pages, move to a next slide, etc. It can be appreciated that the notes drawer tab 18 may be displayed in any suitable location within the attachment 1 UI 90 and the positioning shown in FIG. 8 is for illustrative purposes. Similarly, the notes drawer tab 18 may be operated on to open the notes drawer UI 90 using other input mechanisms such as a tap, double-tap, long press, short swipe (sometimes referred to as a "flick"), etc. Moreover, the content portion 96 may be interacted with in any manner suitable to the input methods supported by the corresponding application 44 and the swipe gesture shown in FIG. 8 is for illustrative purposes.

In FIG. 9, the UI navigation flow returns to the application 1 UI 84. By detecting a selection of the second attachment 88, an application 2 UI 100 is displayed in this example, as shown in FIG. 10. Similar to what is shown in FIG. 8, the notes drawer tab 18 is carried through into the attachment 2 UI 100 and the same notes drawer UI 92 utilized in FIG. 8 can be opened or otherwise revealed by dragging or swiping the tab 18. Within the notes drawer UI 92, additional content 94 can be added, e.g., the text: "Notes for attachment 2" as shown as FIG. 10, as well other media types such as images, audio clips, video clips, etc. The attachment 2 UI 100 also includes its own content portion 102 which includes the content of the second attachment 88 that is displayed for the user of the mobile device 10. As shown in FIG. 10, the user may interact with the content portion 102, e.g., to change pages, move to a next slide, etc.

The notes drawer UI 92 may therefore be carried through to different UI spaces within a logical session to allow for multiple individual note taking and content addition tasks to be performed without having to navigate back and forth to a separate note-taking application and without losing content. The accumulated content 94 added to the notes drawer UI 92 may then be used in various ways. For example, the save option 22 (see FIG. 1) can be used to create a file or note in memory for later use. The content 94 may also be used within a session 50, e.g., the same session 50 in which the notes were made, to utilize the content 94 within an application UI as shown in FIG. 11. In the example shown in FIG. 11, the content 94 of the notes drawer UI 92 may be copied into a second screen of the application 1 UI 104 to utilize the notes taken with respect to the first attachment 86 and the second attachment 88 to reply to a message. By detecting a predetermined input such as a swipe, menu option, etc., the content 94 is copied over to the reply message portion 108 as illustrated by way of example in FIG. 11 to form the content of the reply message. It can therefore be appreciated that the notes drawer UI 92 for the session shown in FIGS. 6 to 11 provides a convenient tool to accumulate and create content in at least one UI space or area within the session 50, and access to that accumulated content within another UI space or area. In this way, navigation between the at least one UI space and a separate application 44 for note taking can be avoided.

Figure 12:
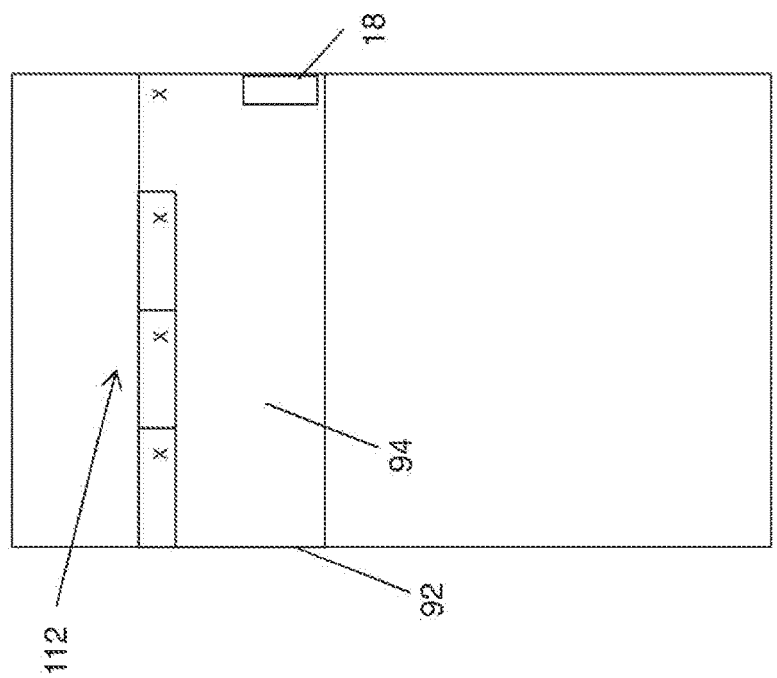
FIG. 12 is a screen shot of a user interface displaying a tabbed notes drawer user interface.

In addition to associating an instance of the notes drawer UI 92 with a logical session 50 and storing drawer content 74 in a session data entry 60 as shown in FIG. 5, multiple sessions can be made available within a particular UI screen in order to allow for the accumulation of content over multiple sessions while maintaining the content-to-session association. For example, as shown in FIG. 12 the notes drawer UI 92 may be configured to include a plurality of tabs 112, each tab 112 providing access to a corresponding session data entry 60. In this way, notes taken in one session could be carried through to a different session's notes. For example, a user may wish to comment on multiple attachments in multiple emails, and ultimately provide comments on all attachments in a single reply email. By providing the tabbed-access to multiple session data entries 60, that user could transfer the contents of notes taken in multiple sessions when replying to the email, even if that reply email is in yet another session 50.

Figure 13:
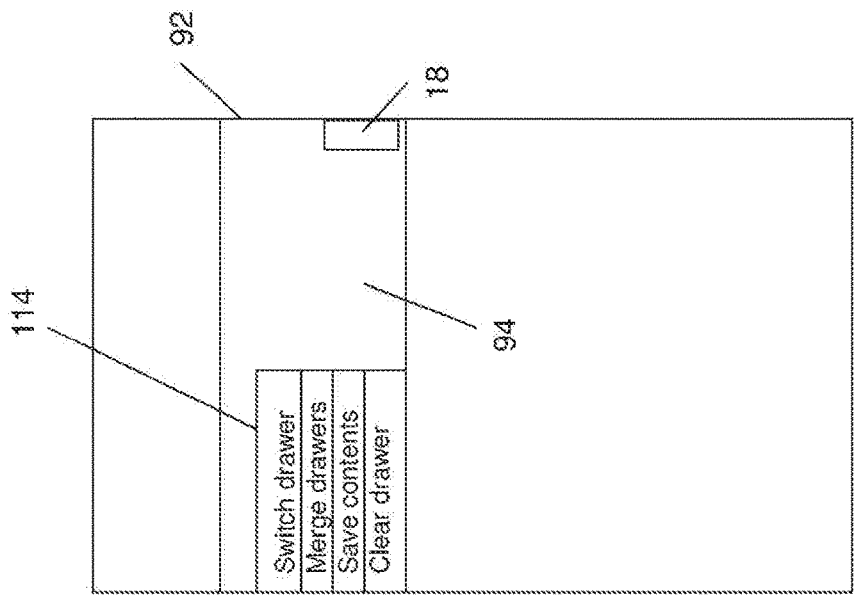
FIG. 13 is a screen shot of a user interface displaying a menu in a notes drawer user interface.

Other mechanisms can be used to provide cross-session access to session data entries 60, such as the menu of options 114 shown in FIG. 13. Such a menu of options 114 can also be used to perform other operations. For example, as shown in FIG. 13, the menu of options 114 can provide options for switching drawers to access content in another session 50; for merging drawers to combine the content of multiple drawers within the current content 94; for saving the contents 94 into a file, attachment, clipboard, etc.; and for clearing the drawer contents 94, to name a few examples.

With respect to merging drawers, it can be appreciated that such an option also allows for building sessions based on criteria such as location, particular contacts or groups, particular applications, etc. For example, a menu option could be provided to allow for all sessions 50 associated with a particular location to be merged together. A location-based merger of session content can be useful for accumulating photos, videos, and comments during a vacation, or to associate sessions with work versus home, etc. Therefore, each session 50 can be logically formed in many ways, and these ways can be configured to be automatically detected and applied, user preferences, policies, etc.

Content that is added to the notes drawer UI 92 can also be retrievable, either automatically based on detection of an event, or manually by detecting user selection of an option or command. For example, the tabs 112 shown in FIG. 12 or menu of options 114 shown in FIG. 13 can be utilized to retrieve content from an existing session 50. In this way, upon re-entering a particular UI or UI card, previous notes taken in that session 50 can be populated in the notes drawer UI 92 by retrieving a session data entry 60. This can be done automatically upon detecting that a user has navigated into a UI associated with a previous session 50 (e.g., by referencing the header 62 of the stored session data entries 60), or based on an input such as selecting the notes drawer option 330 (see FIG. 16) after having previously left the session 50. It can be appreciated that the contents in a session data entry 60 can be stored indefinitely until receiving an input to clear the contents of the notes drawer UI 92 (e.g., in the menu of options 114 or other input mechanism), or after reaching a predetermined amount of time.

Figure 14:
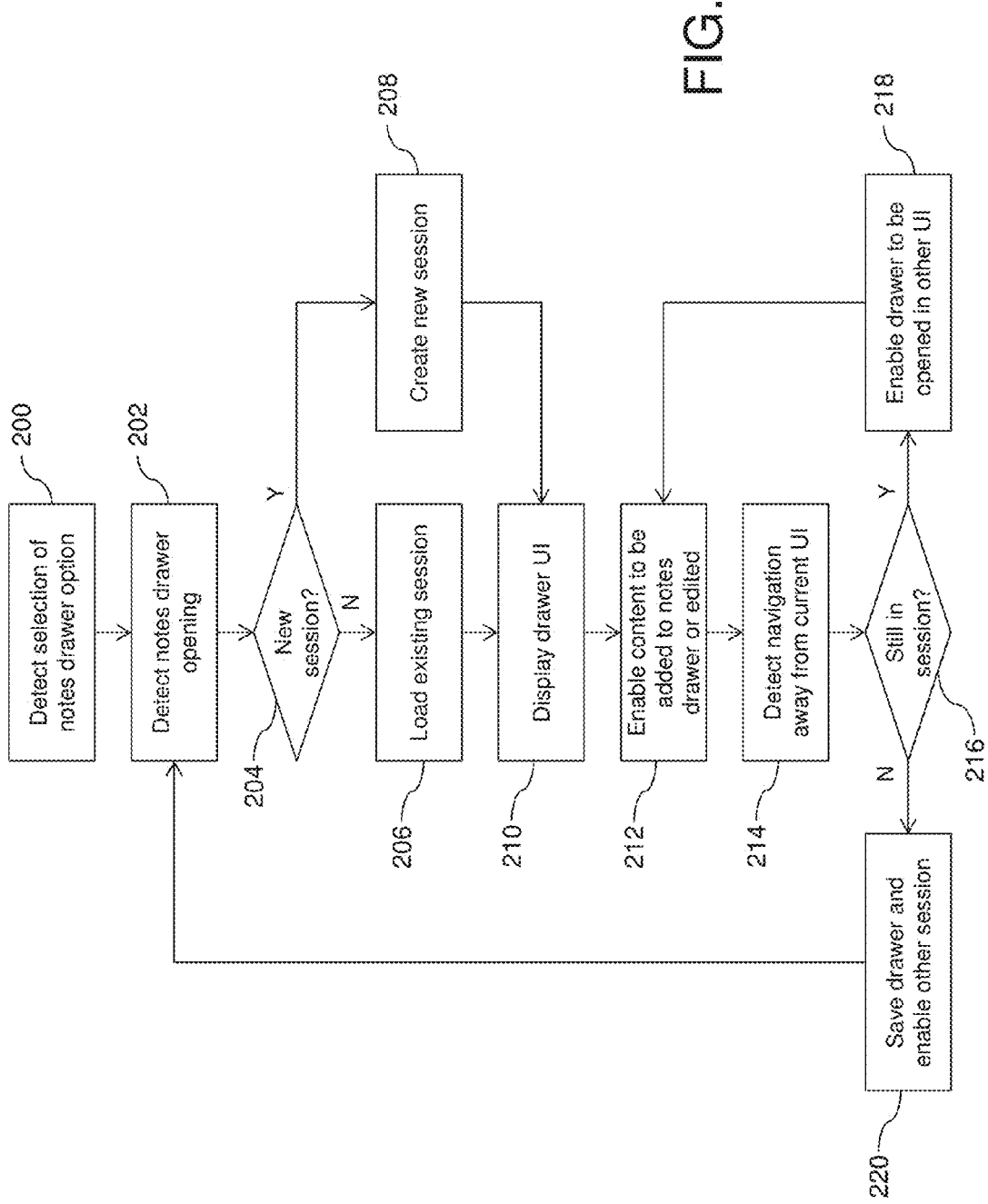
FIG. 14 is a flow chart illustrating example computer executable operations that may be performed in using a notes drawer user interface.

FIG. 14 illustrates computer executable operations that may be performed in providing the notes drawer UI 92 and creating a session 50 and session data entry 60 therefor. At 200 the mobile device 10 detects usage or activation of the notes drawer 46, in this example by detecting a selection of a notes drawer option 330 (see FIG. 16 described below). The mobile device 10 detects an opening of the notes drawer UI 92 at 202, e.g., by detecting a swipe or long press applied to the notes drawer tab 18. The notes drawer 46 determines at 204 whether or not the notes drawer UI 92 to be displayed is associated with a new or existing session. If a new session 50 is to be created, a new session is created at 208. If an existing session 50 has been determined, the corresponding session data entry 60 is loaded at 206 and the notes drawer UI 92 is displayed at 210 for the new or existing session 50. It can be appreciated that for existing sessions 50 there may also be existing content 94 that is displayed. The notes drawer 46 enables content 94 to be added to the notes drawer UI 92 or existing content to be edited or deleted at 212, to allow for the accumulation of multiple portions of content 94 from within different UI spaces.

At 214 the application 44 currently being used or the notes drawer 46 detects navigation away from the current UI screen and determines at 216 whether or not the navigation results in movement to another UI screen within the same session 50 or to a different session or UI space. If the user has moved away from the current session, the drawer content 94 is saved or otherwise persisted in association with the session being left at 220 and another session 50 can be enabled or created by repeating operations from 202. If the navigation away from the current UI screen is to another UI screen within the same session, the notes drawer UI 92 and notes drawer tab 18 are carried over into the new UI screen and the notes drawer 46 enables the content 94 added or edited at 212 to be displayed within another UI screen at 218. Operations may also repeat from 212 until navigating away from the session 50. It can be appreciated that in addition to navigating away from a session, the notes drawer UI 92 can also be de-activated by other mechanisms such as selection of the notes drawer option 330 shown in FIG. 16.

Figures 15, 16:
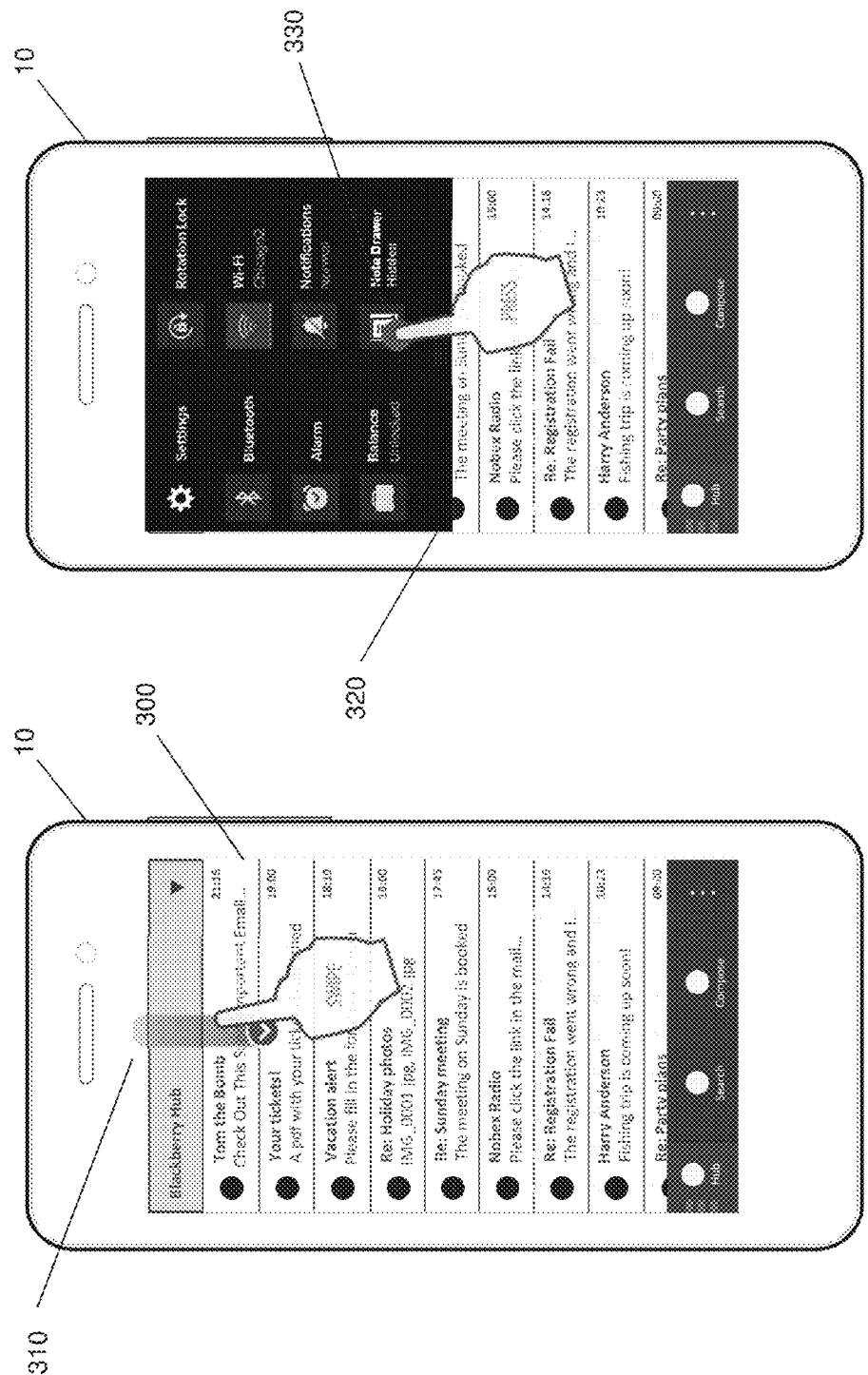

To further illustrate at least some of the principles discussed above, FIGS. 15 through 32 illustrate UI navigation flow in which the notes drawer UI 92 is utilized. In FIG. 15 a message hub UI 300 is shown in which a downward swipe from a non-display portion 310 of the mobile device 10 reveals a menu 320 as shown in FIG. 16. The menu 320 in this example includes the notes drawer option 330, which can be selected and de-selected from the menu 320 to activate/de-activate the notes drawer 46. The notes drawer tab 18 is then displayed within the current application 44 (the hub UI 300 in this example) as shown in FIG. 17. A message entry 340 may be selected as shown in FIG. 18 to display a message UI 400 as shown in FIG. 19. In this example the message UI 400 displays an attachment 410 and message content 420. By selecting the attachment 410 an attachment UI 430 is displayed as shown in FIG. 20. The attachment UI 430 includes a content viewer portion 440 and carries forward the notes drawer tab 18 to provide access to the notes drawer UI 92. As illustrated in FIG. 20, the user may interact with the content viewer portion 440 to review the contents of the attachment 410.

The notes drawer tab 18 may then be interacted with, in this example by way of a touch or press gesture shown in FIG. 21, to reveal the notes drawer UI 92 as illustrated in FIG. 22. Content 510 can be added to the notes drawer UI 92, as discussed above, and the content can be saved for later use outside of the session, e.g., by selecting a save option 520. It can be appreciated that the save option 520 can be configured to create a new file such as a PDF, word processing format, notes format, image, etc. The contents 510 can also be saved to any suitable application such as a calendar, address book, personal information manager (PIM), specialized organizer, etc. As also illustrated in FIG. 22, the notes drawer UI 92 and content viewer portion 440' may be re-sized and re-arranged to accommodate the notes drawer UI 92 and other UI elements such as a virtual keyboard 450 that is selectively displayed when needed.

Figure 23:
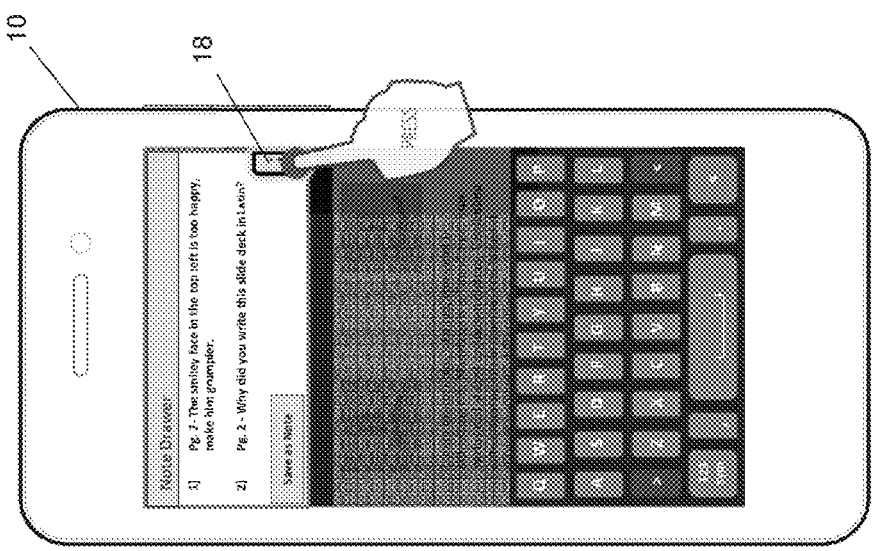
Figure 24:
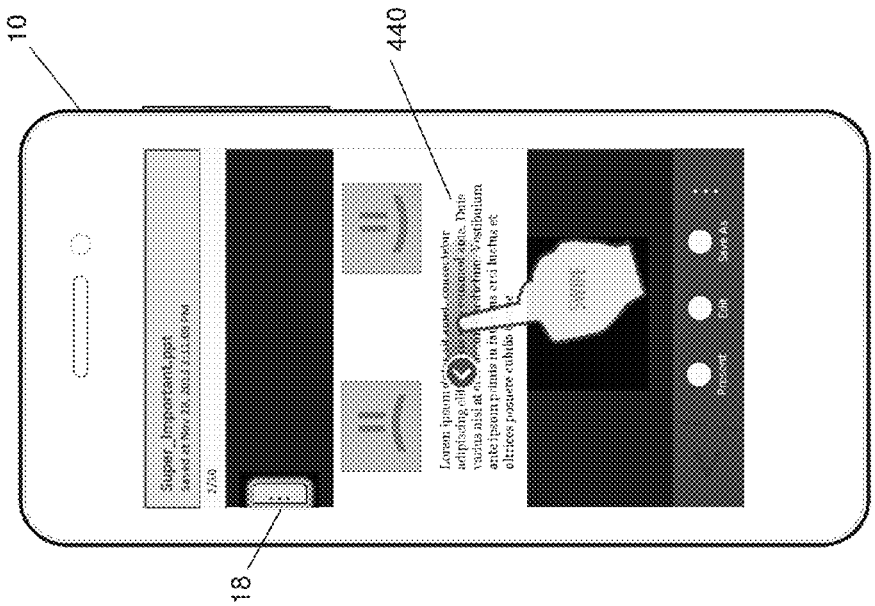

The notes drawer UI 92 can also be stowed or otherwise closed as shown in FIG. 23, in this example by way of a similar press or touch gesture applied to the notes drawer tab 18. In this way, the notes drawer UI 92 can be selectively opened and closed while interacting with the content viewer portion 440 of the attachment UI 430 as shown in FIG. 24. In FIG. 25, the notes drawer UI 92 is opened again within the same session 50 to reveal and interact with the existing content 510 to create updated content 610 using the virtual keyboard 450, while displaying a current UI screen 600, as illustrated in FIG. 26.

Figure 28:
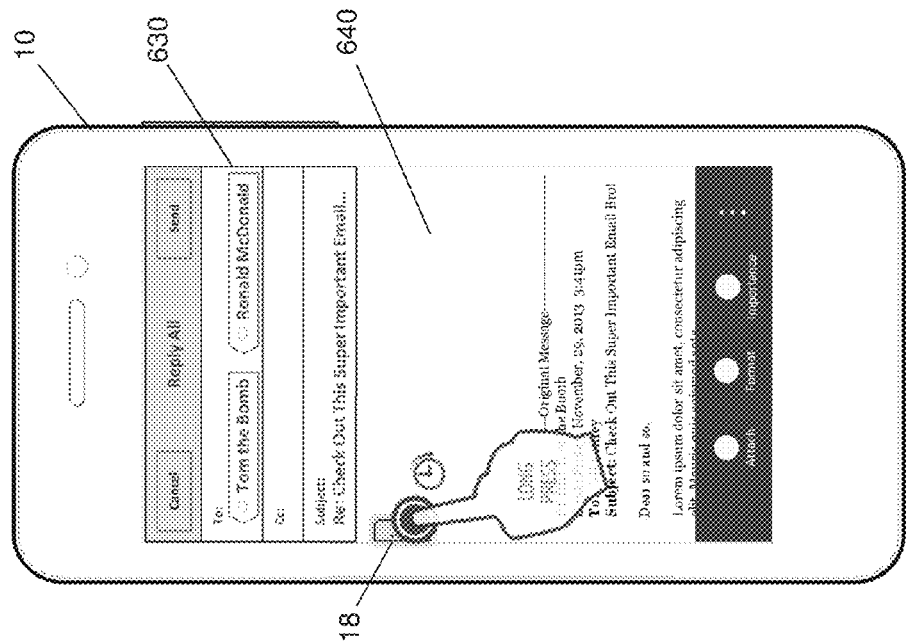
Figure 27:
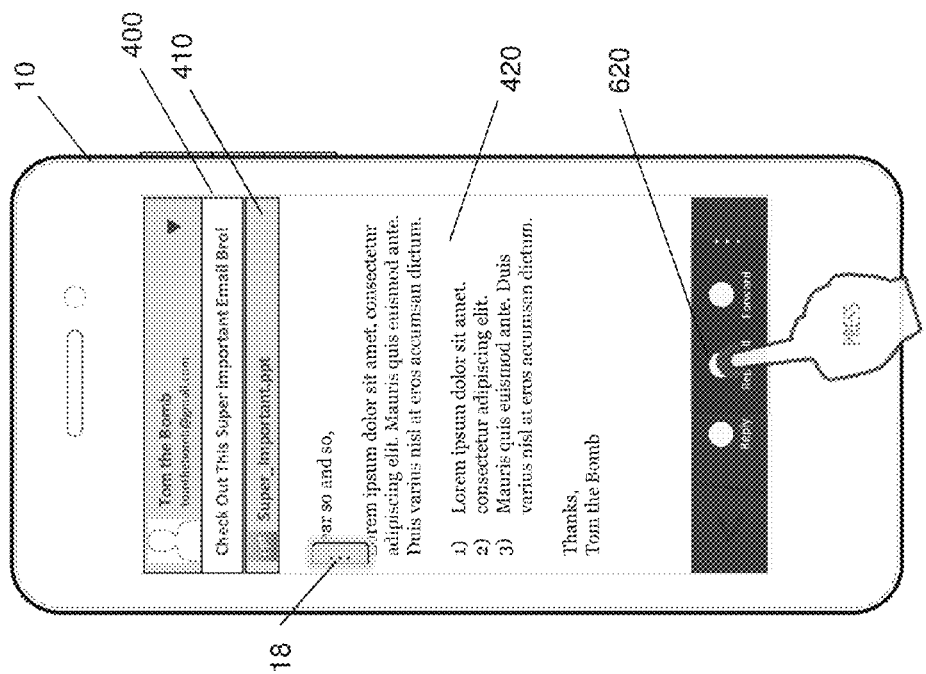
Figure 29:
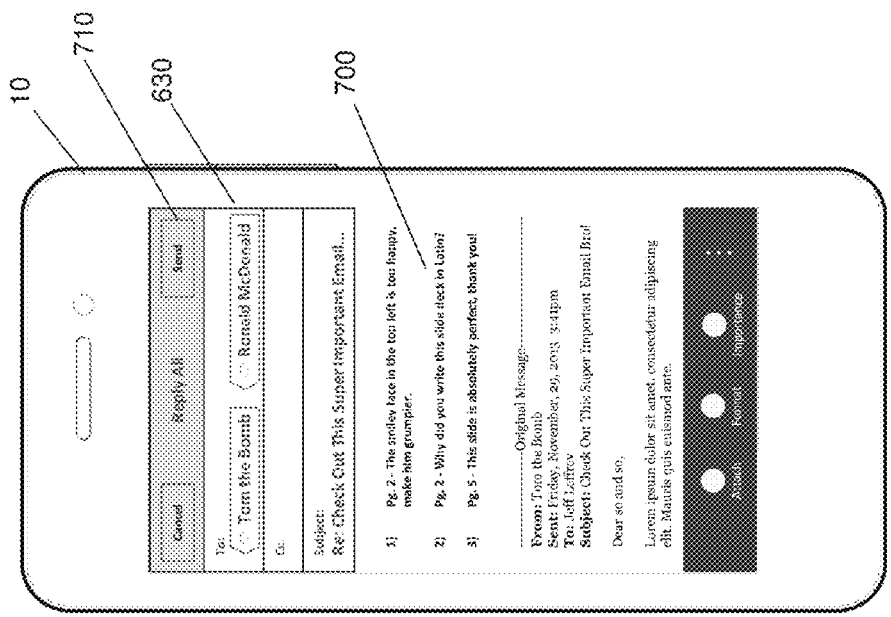

FIG. 27 illustrates navigation back to the message UI 400 with the notes drawer tab 18 being displayed to provide convenient access to the content accumulated while taking notes with respect to the attachment 410. In this example, by selecting a message reply option 620, a message reply UI 630 is displayed as shown in FIG. 28, which includes a message reply content portion 640. To utilize the contents 610 of the notes drawer UI 92, in this example a long press or touch sustained for a predetermined amount of time can allow for a shortcut operation to insert the contents 610 of the notes drawer UI 92 for that session 50 into the message reply content portion 620. After the predetermined amount of time, message reply contents 700 are inserted using the contents 610 of the notes drawer UI 92 as shown in FIG. 29 and a reply message can be sent, e.g., by selecting a send button 710. In this way, the note-taking performed during the session can be conveniently re-purposed for message content thus allowing for seamless multi-tasking within a logical session 50.

Figure 30:
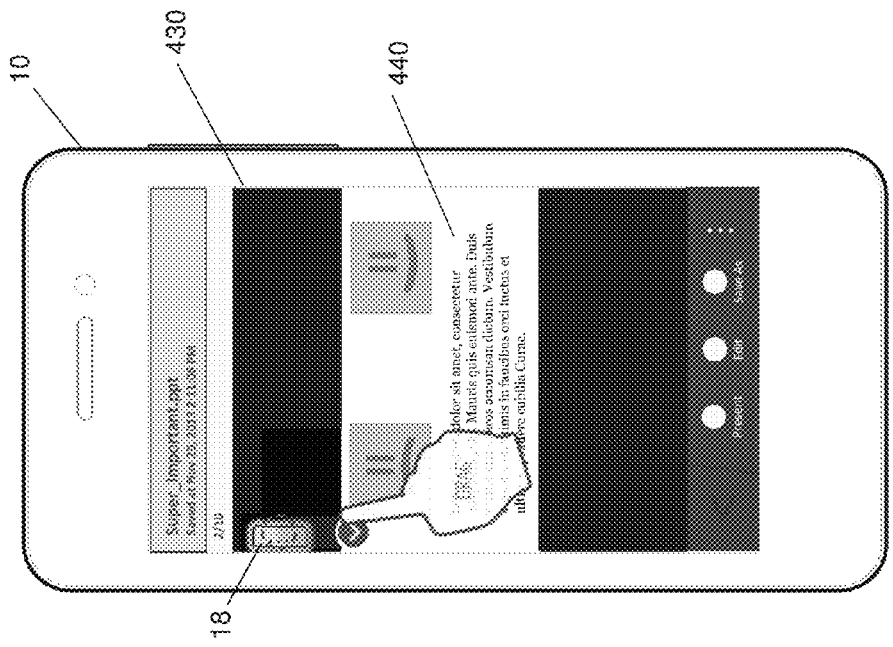

As discussed above, the notes drawer tab 18 can be movable to allow for a customized experience. FIG. 30 illustrates a drag gesture applied to the notes drawer tab 18 enabling the notes drawer tab 18 to be moved to a lower portion of the attachment UI 430 as shown in FIG. 31. Then, as illustrated in FIG. 32, opening the notes drawer UI 92 caused the content 510 to be displayed in a different location, in this example adjacent the virtual keyboard 450.

While the above examples illustrate usage of the notes drawer UI 92 in the context of reviewing and commenting on attachments to messages, it can be appreciated this is one illustrative example. For example, the notes drawer UI 92 can be used in a media player or viewer to create notes or comments on a collection of photos or videos and the contents 94 of that session 50 accessible within a social media application or website. Also, the contents 94 can be a combination of several types of media, e.g., text, voice notes, video, images, etc.

As discussed above, the session 50 can be logically determined automatically or based on user-defined configurations or preferences such as location-based, application based, contact or group based, etc. Therefore the notes drawer UI 92 can be made available in various contexts and applications 44 for various purposes and tasks. Moreover, the drawer session cloud storage 34 and/or short-range communication connection 38 can be leveraged to propagate session data 32 between devices 10, 36, to allow for seamless use of the notes drawer 46 regardless of the underlying hardware being used at a particular time.

It will also be appreciated that although the above examples were illustrated using mobile devices 10, the principles discussed herein are equally applicable to any electronic device, including those not having communication capabilities, e.g., allowing note taking within a device's domain but across several UI screens.

Figure 33:
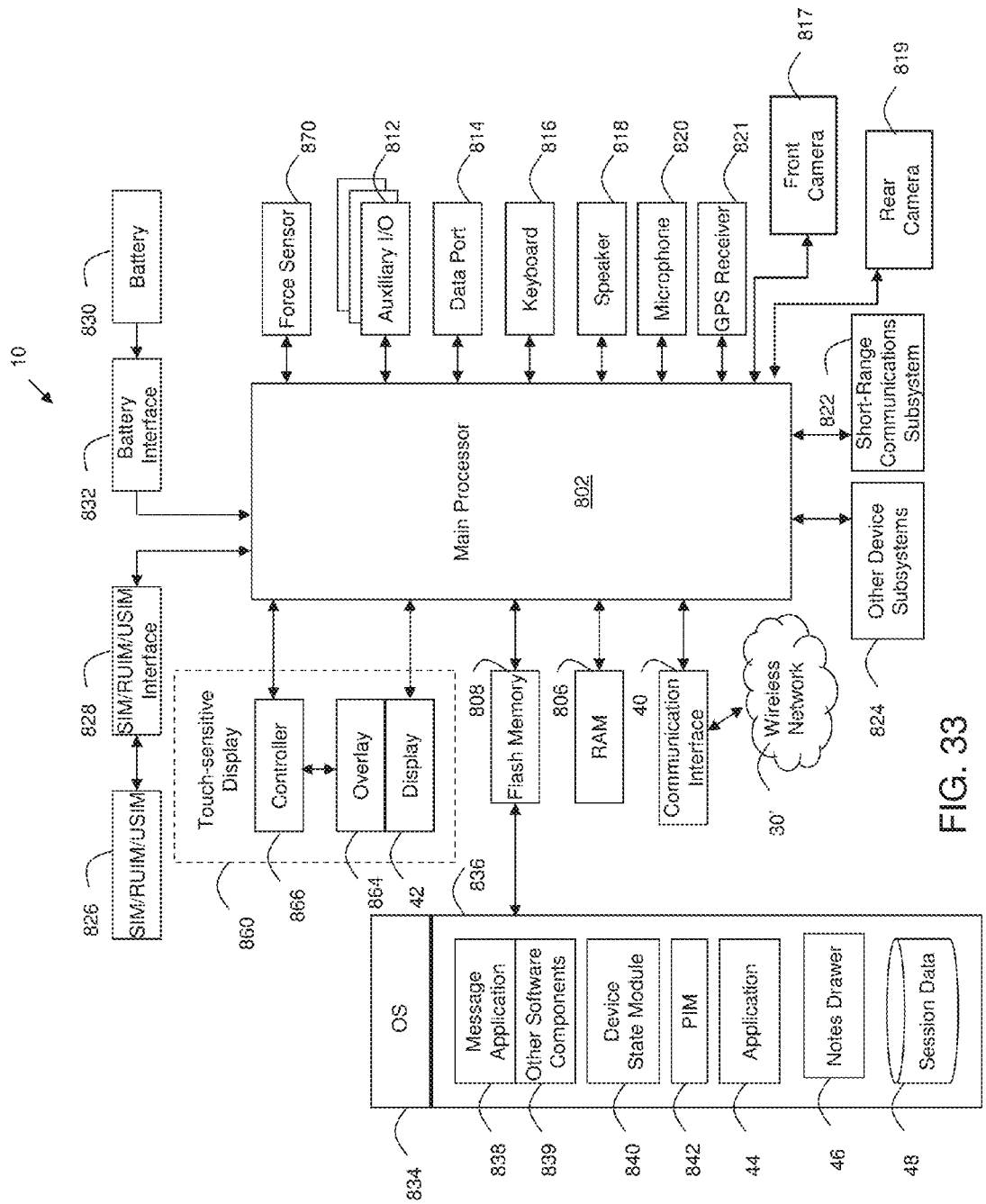
FIG. 33 is a block diagram illustrating an example of a configuration for a mobile device connectable to a wireless network.

While the principles discussed herein may be applied to any electronic device, referring now to FIG. 33, and to further aid in the understanding of the example in which mobile devices 10 are utilized, as described above, shown therein is a block diagram of an example configuration of a device configured as a "mobile device". The mobile device 10 includes a number of components such as a main processor 802 that controls the overall operation of the mobile device 10. Communication functions, including data and voice communications, are performed through at least one communication interface 40. The communication interface 40 receives messages from and sends messages to a wireless network 30'. In this example of the mobile device 10, the communication interface 40 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 40 with the wireless network 30' represents one or more different Radio Frequency (RF) channels, operating according to defined protocols specified for GSM/GPRS communications.

The main processor 802 also interacts with additional subsystems such as a Random Access Memory (RAM) 806, a flash memory 808, a touch-sensitive display 860, an auxiliary input/output (I/O) subsystem 812, a data port 814, a keyboard 816 (physical, virtual, or both), a speaker 818, a microphone 820, a GPS receiver 821, a front camera 817, a rear camera 819, short-range communications subsystem 822, and other device subsystems 824. Some of the subsystems of the mobile device 10 perform communication-related functions, whereas other subsystems may provide "resident" or on-device functions. By way of example, the touch-sensitive display 860 and the keyboard 816 may be used for both communication-related functions, such as entering a text message for transmission over the wireless network 30', and device-resident functions such as a calculator or task list. In one example, the mobile device 10 can include a non-touch-sensitive display in place of, or in addition to the touch-sensitive display 860. For example the touch-sensitive display 860 can be replaced by a display 42 that may not have touch-sensitive capabilities.

The mobile device 10 can send and receive communication signals over the wireless network 30' after required network registration or activation procedures have been completed. Network access is associated with a subscriber or user of the mobile device 10. To identify a subscriber, the mobile device 10 may use a subscriber module component or "smart card" 826, such as a Subscriber Identity Module (SIM), a Removable User Identity Module (RUIM) and a Universal Subscriber Identity Module (USIM). In the example shown, a SIM/RUIM/USIM 826 is to be inserted into a SIM/RUIM/USIM interface 828 in order to communicate with a network.

The mobile device 10 is typically a battery-powered device and includes a battery interface 832 for receiving one or more rechargeable batteries 830. In at least some examples, the battery 830 can be a smart battery with an embedded microprocessor. The battery interface 832 is coupled to a regulator (not shown), which assists the battery 830 in providing power to the mobile device 10. Although current technology makes use of a battery, future technologies such as micro fuel cells may provide the power to the mobile device 10.

The mobile device 10 also includes an operating system 834 and software components 836 to 842, 44, 46 and 48. The operating system 834 and the software components 836 to 842, 44, 46 and 48, that are executed by the main processor 802 are typically stored in a persistent store such as the flash memory 808, which may alternatively be a read-only memory (ROM) or similar storage element (not shown). Those skilled in the art will appreciate that portions of the operating system 834 and the software components 836 to 842, 44, 46 and 48, such as specific device applications, or parts thereof, may be temporarily loaded into a volatile store such as the RAM 806. Other software components can also be included, as is well known to those skilled in the art.

The subset of software applications 836 that control basic device operations, including data and voice communication applications, may be installed on the mobile device 10 during its manufacture. Software applications may include a message application 838, a device state module 840, a Personal Information Manager (PIM) 842, an application 44, a notes drawer 46, and notes drawer session data 48. A message application 838 can be any suitable software program that allows a user of the mobile device 10 to send and receive electronic messages, wherein messages are typically stored in the flash memory 808 of the mobile device 10. A device state module 840 provides persistence, i.e. the device state module 840 ensures that important device data is stored in persistent memory, such as the flash memory 808, so that the data is not lost when the mobile device 10 is turned off or loses power. A PIM 842 includes functionality for organizing and managing data items of interest to the user, such as, but not limited to, e-mail, contacts, calendar events, and voice mails, and may interact with the wireless network 30'.

Other types of software applications or components 839 can also be installed on the mobile device 10. These software applications 839 can be pre-installed applications (i.e. other than message application 838) or third party applications, which are added after the manufacture of the mobile device 10. Examples of third party applications include games, calculators, utilities, etc.

The additional applications 839 can be loaded onto the mobile device 10 through at least one of the wireless network 16', the auxiliary I/O subsystem 812, the data port 814, the short-range communications subsystem 822, or any other suitable device subsystem 824.

The data port 814 can be any suitable port that enables data communication between the mobile device 10 and another computing device. The data port 814 can be a serial or a parallel port. In some instances, the data port 814 can be a Universal Serial Bus (USB) port that includes data lines for data transfer and a supply line that can provide a charging current to charge the battery 830 of the mobile device 10.

For voice communications, received signals are output to the speaker 818, and signals for transmission are generated by the microphone 820. Although voice or audio signal output is accomplished primarily through the speaker 818, the display 42 can also be used to provide additional information such as the identity of a calling party, duration of a voice call, or other voice call related information.

The touch-sensitive display 860 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 860 is a capacitive touch-sensitive display which includes a capacitive touch-sensitive overlay 864. The overlay 864 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 42 of the touch-sensitive display 860 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 860. The processor 802 may determine attributes of the touch, including a location of a touch. Touch location data may include an area of contact or a single point of contact, such as a point at or near a center of the area of contact, known as the centroid. A signal is provided to the controller 866 in response to detection of a touch. A touch may be detected from any suitable object, such as a finger, thumb, appendage, or other items, for example, a stylus, pen, or other pointer, depending on the nature of the touch-sensitive display 860. The location of the touch moves as the detected object moves during a touch. One or both of the controller 866 and the processor 802 may detect a touch by any suitable contact member on the touch-sensitive display 860. Similarly, multiple simultaneous touches, are detected.

In some examples, an optional force sensor 870 or force sensors is disposed in any suitable location, for example, between the touch-sensitive display 860 and a back of the mobile device 10 to detect a force imparted by a touch on the touch-sensitive display 860. The force sensor 870 may be a force-sensitive resistor, strain gauge, piezoelectric or piezoresistive device, pressure sensor, or other suitable device.

It will be appreciated that any module or component exemplified herein that executes instructions may include or otherwise have access to computer readable media (including non-transitory computer readable media) such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, cloud storage 34, any component of or related to these entities, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method performed by an electronic device, the method comprising:
   displaying a user interface portion with a first application user interface after detecting a first input;
   in response to displaying the user interface portion with the first application user interface, associating the first application user interface and a first content with a first session of the user interface portion;
   displaying the user interface portion with a second application user interface after detecting a second input, the user interface portion comprising the first content that was associated with the first session of the user interface portion while the user interface portion was displayed with the first application user interface; and
   in response to displaying the user interface portion with the second application user interface, associating the second application user interface and a second content with the first session of the user interface portion,
   wherein the user interface portion comprises a plurality of content sets associated with the user interface portion across a plurality of different sessions of the user interface portion, wherein the plurality of different sessions comprises at least the first session, and wherein displaying the user interface with at least the second application user interface further comprises organizing the plurality of content sets according to their associated session in the plurality of sessions,
   each session in the plurality of different sessions enabling the user interface portion to display common content within a plurality of application user interfaces associated with the session, and
   wherein the user interface portion displays different content for different sessions.

2. The method of claim 1, wherein the session is determined according to a logical relationship between the first application user interface and the second application user interface.

3. The method of claim 1, further comprising populating at least one of the second application user interface and a third application user interface with the content after detecting a third input.

4. The method of claim 1, wherein the user interface portion is displayed in the first application user interface by enlarging the user interface portion to reveal contents thereof, and wherein the user interface portion is reduced in size prior to displaying the user interface portion in the second application user interface.

5. The method of claim 1, further comprising:
enabling additional content to be associated with the user interface portion while the user interface portion is displayed with the second application user interface; and
displaying the user interface portion with a third application user interface after detecting a third input, the user interface portion comprising at least the additional content that was associated with the user interface portion while the user interface portion was displayed with the second application user interface.

6. The method of claim 1, further comprising storing the content.

7. The method of claim 6, further comprising at least one of storing the content locally, and sending the content to a remote storage location via a network.

8. The method of claim 7, wherein content stored at the remote storage location is accessible to a plurality of devices.

9. An electronic device comprising a processor, a display and a memory, the memory comprising computer executable instructions for causing the processor to operate the electronic device, computer executable instructions for:
displaying a user interface portion with a first application user interface after detecting a first input;
in response to displaying the user interface portion with the first application user interface, associating the first application user interface and a first content with a a first session of the user interface portion;
displaying the user interface portion with a second application user interface after detecting a second input, the user interface portion comprising the first content that was associated with the first session of the user interface portion while the user interface portion was displayed with the first application user interface; and
in response to displaying the user interface portion with the second application user interface, associating the second application user interface and a second content with the first session of the user interface portion,
wherein the user interface portion comprises a plurality of content sets associated with the user interface portion across a plurality of different sessions of the user interface portion, wherein the plurality of different sessions comprises at least the first session, and wherein displaying the user interface with at least the second application user interface further comprises organizing the plurality of content sets according to their associated session in the plurality of sessions,
each session in the plurality of different sessions enabling the user interface portion to display common content within a plurality of application user interfaces associated with the session, and
wherein the user interface portion displays different content for different sessions.

10. Computer executable instructions stored on a non-transitory computer readable medium, the computer executable instructions comprising instructions for:
displaying a user interface portion with a first application user interface after detecting a first input;
in response to displaying the user interface portion with the first application user interface, associating the first application user interface and a first content with a first session of the user interface portion;
displaying the user interface portion with a second application user interface after detecting a second input, the user interface portion comprising the first content that was associated with the first session of the user interface portion while the user interface portion was displayed with the first application user interface; and
in response to displaying the user interface portion with the second application user interface, associating the second application user interface and a second content with the first session of the user interface portion,
wherein the user interface portion comprises a plurality of content sets associated with the user interface portion across a plurality of different sessions of the user interface portion, wherein the plurality of different sessions comprises at least the first session, and wherein displaying the user interface with at least the second application user interface further comprises organizing the plurality of content sets according to their associated session in the plurality of sessions,
each session in the plurality of different sessions enabling the user interface portion to display common content within a plurality of application user interfaces associated with the session, and
wherein the user interface portion displays different content for different sessions.

11. The computer executable instructions of claim 10, wherein the session is determined according to a logical relationship between the first application user interface and the second application user interface.

12. The computer executable instructions of claim 10, further comprising instructions for populating at least one of the second application user interface and a third application user interface with the content after detecting a third input.

13. The computer executable instructions of claim 10, wherein the user interface portion is displayed in the first application user interface by enlarging the user interface portion to reveal contents thereof, and wherein the user interface portion is reduced in size prior to displaying the user interface portion in the second application user interface.

14. The computer executable instructions of claim 10, further comprising instructions for:
enabling additional content to be associated with the user interface portion while the user interface portion is displayed with the second application user interface; and
displaying the user interface portion with a third application user interface after detecting a fourth input, the user interface portion comprising at least the additional content that was associated with the user interface portion while the user interface portion was displayed with the second application user interface.

15. The computer executable instructions of claim 10, further comprising storing the content.

16. The computer executable instructions of claim 15, further comprising at least one of storing the content locally, and sending the content to a remote storage location via a network.

17. The computer executable instructions of claim 16, wherein content stored at the remote storage location is accessible to a plurality of devices.

* * * * *